US007908184B2

(12) United States Patent
Choe

(10) Patent No.: US 7,908,184 B2
(45) Date of Patent: Mar. 15, 2011

(54) METHOD OF PROVIDING CUSTOMIZED INFORMATION OF COMMODITY FOR ON-LINE SHOPPING MALL USERS

(75) Inventor: Jeong Ok Choe, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 420 days.

(21) Appl. No.: 11/858,015

(22) Filed: Sep. 19, 2007

(65) Prior Publication Data

US 2008/0004986 A1    Jan. 3, 2008

Related U.S. Application Data

(63) Continuation of application No. PCT/KR2006/001046, filed on Mar. 22, 2006.

(30) Foreign Application Priority Data

Mar. 22, 2005   (KR) .................. 10-2005-0023499

(51) Int. Cl.
 *G06Q 30/00* (2006.01)
(52) U.S. Cl. ................................... 705/26.7
(58) Field of Classification Search .......... 705/26, 705/27
See application file for complete search history.

(56) References Cited

U.S. PATENT DOCUMENTS

| | | | | |
|---|---|---|---|---|
| 6,963,850 B1 * | 11/2005 | Bezos et al. | ............... | 705/26 |
| 2001/0011235 A1 * | 8/2001 | Kim et al. | ............... | 705/26 |
| 2002/0004420 A1 * | 1/2002 | Suga et al. | ............... | 463/7 |
| 2002/0019763 A1 * | 2/2002 | Linden et al. | ............... | 705/10 |
| 2002/0147642 A1 * | 10/2002 | Avallone et al. | ............... | 705/14 |
| 2003/0033301 A1 * | 2/2003 | Cheng et al. | ............... | 707/6 |
| 2004/0073485 A1 * | 4/2004 | Liu et al. | ............... | 705/14 |

FOREIGN PATENT DOCUMENTS

| | | |
|---|---|---|
| KR | 10-2000-0054666 A | 9/2000 |
| KR | 10-2001-0091458 A | 10/2001 |
| KR | 10-2001-0092819 A | 10/2001 |
| KR | 10-2002-0007742 A | 1/2002 |
| KR | 10-2002-0011208 A | 2/2002 |
| KR | 10-2006-0005153 A | 1/2006 |

OTHER PUBLICATIONS

Kwok-Wai Cheung, & Lily F. Tian, "Learning User Similarity and Rating Style for Collaborative Recommendation", Kluwer Academic Publishers, Special Issue on ECIR, 7(3-4), 395-410, Jul. 24, 2003.*
International Search Report regarding PCT Application No. PCT/KR2006001046 dated Apr. 27, 2006.
Written Opinion regarding International Search Report regarding PCT Application No. PCT/KR2006001046 dated Apr. 27, 2006.
Office Action dated Oct. 20, 2006 from the corresponding Korean patent application No. 10-2005-0023499.

\* cited by examiner

*Primary Examiner* — Amee A Shah
*Assistant Examiner* — Brandy Zukanovich
(74) *Attorney, Agent, or Firm* — H.C. Park & Associates, PLC

(57) ABSTRACT

Disclosed is a method of providing customized product information. The method includes maintaining a basic index database for recording basic index data associated with a plurality of users for each product model, extracting the basic index data of the user corresponding to a predetermined classification standard from the basic index database, generating point information associated with each product model by calculating the extracted basic index data, and displaying each product model on a predetermined webpage according to the generated point information.

13 Claims, 7 Drawing Sheets

FIG. 3

| MODEL IDENTIFIER (301) | PRODUCT CATEGORY (302) | USER INFORMATION (303) | DETAILED DESCRIPTION PAGE (304) | SHORTCUT CLICK LOG COUNT (305) | SALES FIGURE (306) |
|---|---|---|---|---|---|
| COOLPIX4100 | DIGITAL CAMERA | SUEZO00, 25, M | 17 | 11 | 25 |
| | | SEVEN, 17, M | 5 | 3 | 19 |
| | | BLUESKY, 26, F | 22 | 18 | 38 |
| | | JKI23, 30, M | 31 | 25 | 45 |
| | | ... | ... | ... | ... |
| TYPE1JEAN | TROUSERS | JKI23, 30, M | 9 | 5 | 13 |
| | | ... | ... | ... | ... |

| HOUSEHOLD ELECTRICAL APPLIANCES ■ MOBILE PHONE/DIGITAL CAMERA |||
|---|---|---|
| PERIOD | ■THREE MONTHS  □SIX MONTHS  □ONE YEAR □TOTAL ||
| AGE | □~TEENS □TWENTIES ■THIRTIES □FORTIES □FIFTIES □TOTAL ||
| SEX | ■MALE  □FEMALE  □TOTAL ||

*WHEN CHECKING DESIRABLE ITEM, IT IS REFLECTED ON GRAPH.

CHECK

METHOD OF PROVIDING CUSTOMIZED INFORMATION OF COMMODITY FOR ON-LINE SHOPPING MALL USERS

CROSS-REFERENCE TO RELATED PATENT APPLICATIONS

This application is a continuation application under 35 U.S.C. §365(c) of International Application No. PCT/KR2006/001046, filed Mar. 22, 2006 designating the United States. International Application No. PCT/KR2006/001046 was published in English as WO2006/101348 A1 on Sep. 28, 2006. This application further claims the benefit of the earlier filing dates under 35 U.S.C. §365(b) of Korean Patent Application No. 10-2005-0023499 filed Mar. 22, 2005. This application incorporates herein by reference the International Application No. PCT/KR2006/001046 including the International Publication No. WO2006/101348 A1 and the Korean Patent Application No. 10-2005-0023499 in their entirety.

BACKGROUND

1. Field

The present disclosure relates to a method of providing product information in the context of on-line sales, and more particularly, to providing a product information customized for users of on-line shopping mall.

2. Discussion of the Related Technology

Currently, many people use the Internet due to development of information communication, and various kinds of services using the Internet are provided together with the increase of the use of the Internet. Accordingly, Internet users may use various services such as shopping, playing games, watching movies, and listening to music via on-line. Particularly, many Internet users use on-line shopping service because products may be purchased without time restriction or visiting a store or shop. Also, according to increased use of the on-line shopping malls, shopping mall intermediate systems providing information with respect to products sold by a plurality of shopping malls are also increased. The number of products sold or handled by on-line shopping malls or shopping mall intermediate systems increases in proportion to the development of on-line shopping systems, and a method of providing product information to users also varies.

Generally, in an on-line shopping mall or a shopping mall intermediate system, a user has to search products and check product information via a product search process until a desirable product is retrieved. Particularly, since the user cannot get specific information with respect to a new product or popular product, it is difficult to acquire information helpful for selecting a product. The on-line shopping malls or shopping mall intermediate systems may provide a latest launched product or popular product information. For example, when a user searches for a digital camera, a list of digital cameras may be prepared by using sales volume of the digital cameras and provided to the user. However, if popular products are listed based on only the sales volume of products, such information would not be useful since the product information is not customized to the user. For example, a pair of pants popular for teenagers may be different from one popular to users in their forties.

The foregoing discussion is to provide general background information, and does not constitute an admission of prior art.

SUMMARY

One aspect of the invention provides a method of operating an on-line shopping mall, which comprise: providing a database comprising shopping activity data representing on-line shopping activities of shoppers with regard to goods for sale in the on-line shopping mall, wherein the database further comprise information about the shoppers for use to determine that a shopper belongs to at least one of a plurality of predetermined groups; receiving an input from a user submitted for the on-line shopping mall; upon receipt of the input, determining which a first one of the plurality of predetermined groups the user belongs to; subsequently processing the shopping activity data so as to prioritize popularity of at least part of the goods by the first predetermined group; and transmitting, to a terminal associated with the user, data for displaying a prioritized list of goods that are popular to the first predetermined group.

In the foregoing method, the on-line shopping mall may comprise links configured to open a plurality of on-line stores registered with the on-line shopping mall. The on-line shopping activities comprises at least one selected from the group consisting of clicking links for web pages comprising descriptions of goods, clicking links for web pages of on-line stores of goods, and purchase transactions of goods from on-line stores. The method may further comprise updating the database as the at least one on-line shopping activity is reported. The user input may comprise profiling information of the user. The profiling information may comprise at least of an age and a gender of the user. The user input may comprise a username with or without a password of the user. Determining may comprise referring to pre-recorded user account information. The pre-recorded user account information may comprise at least one of an age and a gender of the user.

Still in the foregoing method, the method may further comprise receiving at least one product category, which the user is desired to purchase or research on. Processing may further comprise: searching in the database for products using the user's desired product category; and prioritizing popularity of the searched products by the first predetermined group. Processing may comprise: computing a score for each of the at least part of goods using the on-line shopping activities involving each of the at least part of goods; and prioritizing the at least part of goods based on the scores thereof. Computing may comprise: retrieving, from the database, an accumulated number of each different on-line shopping activity for a period with regard to a single item of goods; multiplying the accumulated number with a preassigned weight for each different on-line shopping activity so as to obtain a multiplied value; and summing the multiplied values of the different on-line shopping activities to obtain the score for the single item. The on-line shopping activities may comprise at least one selected from the group consisting of clicking links for web pages comprising descriptions of goods, clicking links for web pages of on-line stores of goods, and purchase transactions of goods from on-line stores, wherein the purchase transactions may have a preassigned weight which is larger than that of clicking links for web pages comprising descriptions of goods and clicking links for web pages of on-line stores of goods.

Another aspect of the invention provides a method of displaying goods for sale in an on-line shopping mall, which comprises: submitting an input of a user to an on-line shopping mall; submitting a desired product category to the on-line shopping mall; receiving data for displaying a prioritized list of goods that are belonging to the desired product category and that are popular to a group of shoppers of the on-line shopping mall to which the user belongs, wherein the prioritized list is formed in response to the user's submission of the desired product category; and displaying on a screen the prioritized list of goods, wherein more popular goods are located above or before less popular goods on the screen.

In the foregoing method, the user may be pre-registered with the on-line shopping mall, and wherein submitting an input comprises logging in the on-line shopping mall. Submitting an input may comprise providing the on-line shopping mall with profiling information of the user. The profiling information may comprise at least one of an age and a gender of the user. The prioritized list of goods may be produced by a method comprising: determining, by a server of the on-line shopping mall, which one of the plurality of predetermined groups the user belongs to; and subsequently processing, by the server, shopping activities of the group of shoppers of the on-line shopping mall to which the user belong, so as to prioritize popularity of the goods that belong to the desired product category. Determining may comprise using at least one of an age and a gender of the user.

An aspect of the present invention provides a customized product information providing method and system in which basic index data of a product model associated with a classification standard selected by a predetermined shopping information user is extracted, point information associated with each product model is generated by using the extracted basic index data, and each product model is displayed on a predetermined webpage according to the point information.

An aspect of the present invention also provides a customized product information providing method and system for providing product information suitable for a shopping information user by using point information generated from basic index data associated with user information of the shopping information user, thereby providing product information distinguished from typical services.

An aspect of the present invention also provides a customized product information providing method and system providing an identical product model according to various classification standards, thereby providing product information according to selection of a shopping information user.

An aspect of the present invention provides a method of providing customized product information, the method including: maintaining a basic index database for recording basic index data associated with a plurality of users for each product model; extracting the basic index data of the user corresponding to a predetermined classification standard from the basic index database; generating point information associated with each product model by calculating the extracted basic index data; and displaying each product model on a predetermined webpage according to the generated point information.

Another aspect of the present invention provides a customized product information providing system providing customized product information, the system including: a basic index database for recording basic index data associated with a plurality of users in response to each product model; a data extraction unit extracting the basic index data of the user corresponding to a predetermined classification standard with reference to the basic index database; a point information generation unit generating point information associated with each product model by calculating the extracted basic index data; and a display unit displaying each product model on a predetermined webpage according to the generated point information.

BRIEF DESCRIPTION OF THE DRAWINGS

FIG. 3 is a diagram illustrating a configuration of a basic index database according to an embodiment of the present invention;

FIG. 4 is a diagram illustrating an example of a screen for selecting a classification standard, which is shown to a shopping information user, according to an embodiment of the present invention;

DETAILED DESCRIPTION OF EMBODIMENTS

Hereinafter, embodiments of the present invention will be described with reference to the attached drawings.

Figure 1:
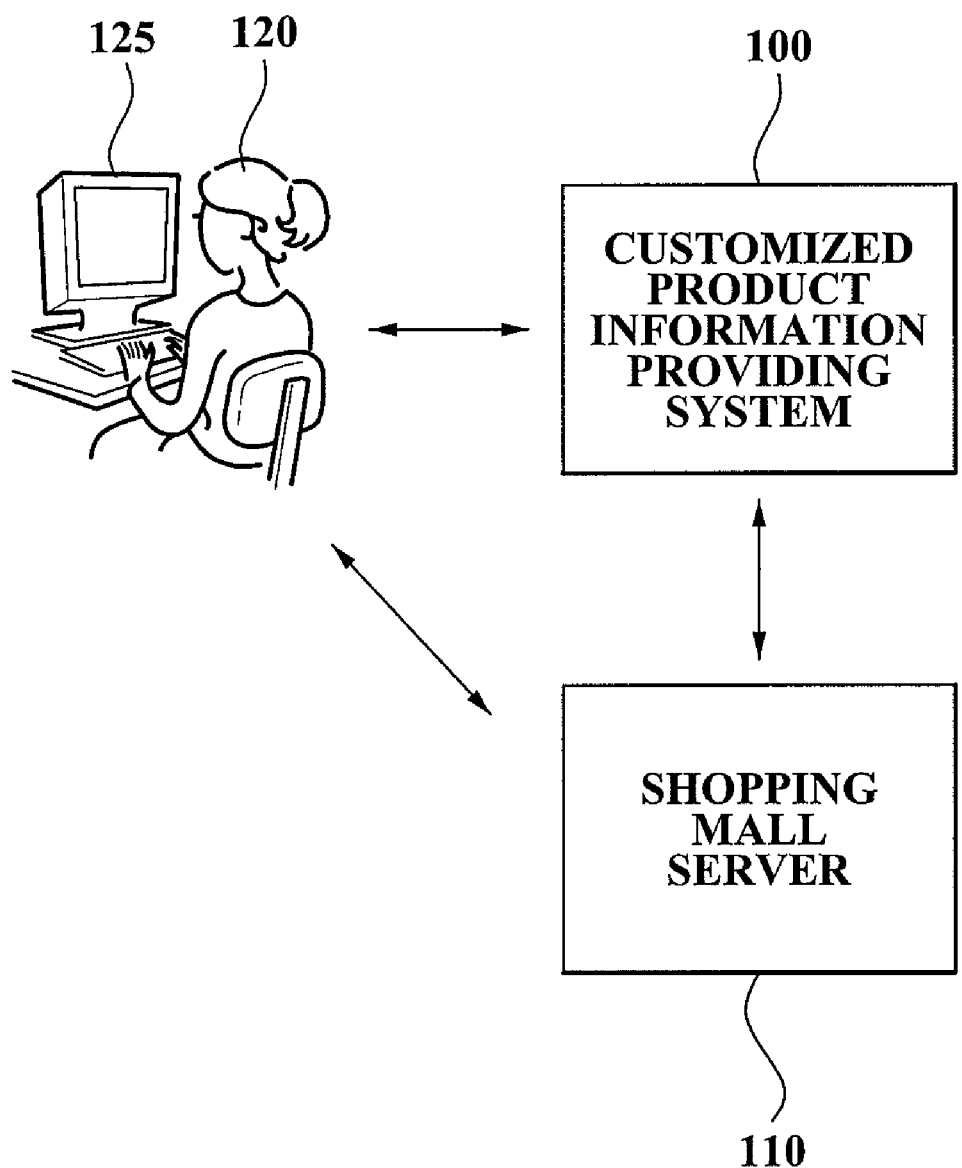
FIG. 1 is a diagram illustrating a schematic configuration of a customized product information providing system according to an embodiment of the present invention.

FIG. 1 is a diagram illustrating a schematic configuration of a customized product information providing system according to an embodiment of the present invention. A customized product information providing system 100 maintains basic index data associated with a plurality of users 120 in response to each product model, generates point information associated with each product model by extracting the basic index data of the user 120 corresponding to a predetermined classification standard information, and displays each product model on a predetermined webpage according to the point information. Also, the customized product information providing system 100 may provide a product model associated with a shopping information user accessing the predetermined webpage by referring to user information of the shopping information user to the shopping information user.

Also, when a search query associated with a product category is received from the shopping information user, the customized product information providing system 100 may generate and display the point information from the basic index data of product models corresponding to the received search query on the webpage. The customized product information providing system 100 may operate while being coupled with a predetermined shopping mall intermediate system providing a product sale webpage associated with products sold by a predetermined shopping mall server or a plurality of shopping mall servers.

A shopping mall server or on-line store server 110 may provide a product sale webpage linked by a hyperlink for each product model provided by the customized product information providing system 100 and may transmit a sales figure of a product model sold in the on-line store via the hyperlink provided by the customized product information providing system 100.

A user terminal 125 is a terminal having a memory unit and operation ability by including a microprocessor, which can access a wired/wireless communication network, and the terminal includes a computing device, such as a desktop PC, a notebook PC, a PDA, and a mobile communication terminal.

Figure 2:
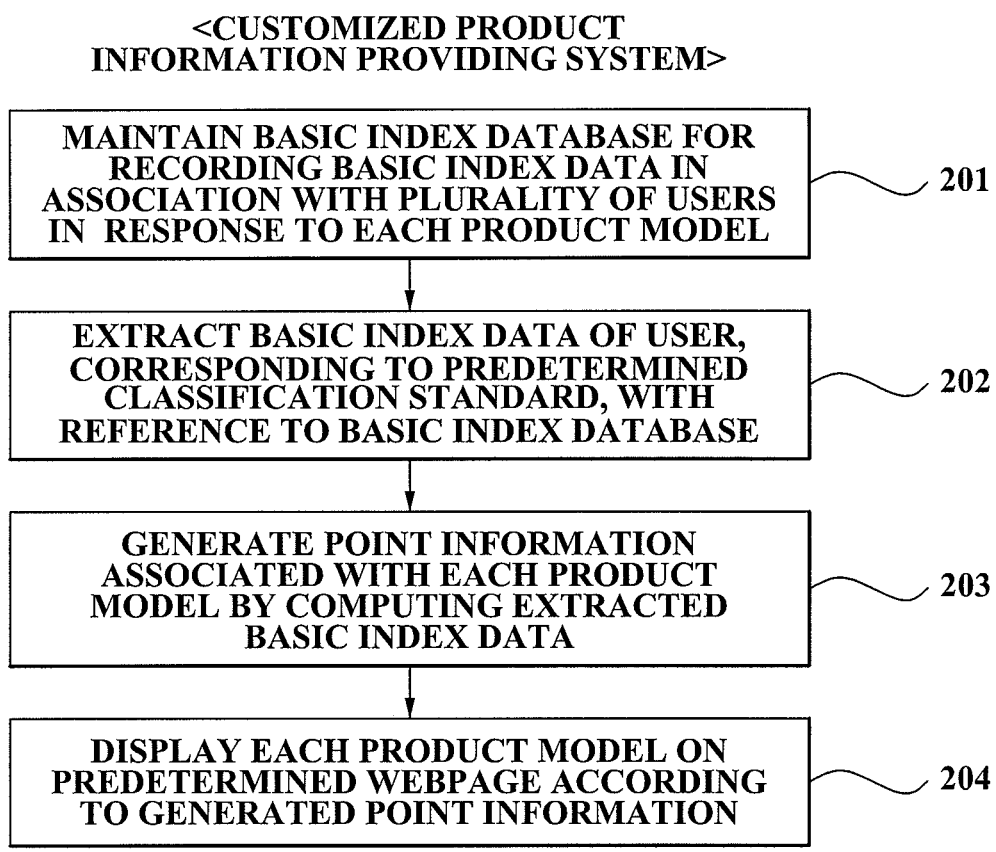
FIG. 2 is a flowchart illustrating a customized product information providing method according to an embodiment of the present invention.

FIG. 2 is a flowchart illustrating a customized product information providing method according to an embodiment of the present invention. The customized product information providing method according to the present embodiment may be performed by the customized product information providing system 100. In operation 201, the customized product information providing system 100 maintains a basic index database for recording basic index data in association with a plurality of users for each product model. The basic index data may include data associated with at least one of a click log count of a detailed description or specification page associated with the product model, a click log count of a hyperlink associated with the product model, and a sales figure of the product model.

The sales figure is the number of the product model sold via a product sale webpage linked to the hyperlink. The sales figure associated with the product model is received from a predetermined shopping mall or on-line store server administrating the product sale webpage and recorded in the basic index database, thereby maintaining the sales figure information. Hereinafter, the basic index database will be described in detail with reference to FIG. 3.

FIG. 3 is a diagram illustrating a configuration of a basic index database 300 according to an embodiment of the present invention. As shown in FIG. 3, the basic index database 300 may include a product model identifier 301, a product category 302, user information 303, a detailed description page click log count 304, a hyperlink click log count 305, and a sales figure 306.

The product model identifier 301 is information for identifying each product model. The product category 302 is product category information of a product associated with the model identifier 301 and may be information such as a digital camera, a book, perfume, and accessories. The user information 303 is information with respect to a user generating basic index data for each product model identifier 301 and may include a user identifier, age information, and sex information. The detailed description page click log count 304 may be the number of clicks of the user for moving a detailed description pages or user's page views of specification pages with respect to the product model associated with the product model identifier 301 or may be a predetermined number generated via a predetermined process of computing the click number. The click number may be recorded for each user.

The hyperlink click log count 305 may be the number of clicks the user made for navigating a purchase page with respect to the product model associated with the product model identifier 301 or may be a predetermined number generated via a predetermined process of computing the click number. The click number may be recorded for each user.

The sales FIG. 306 is information of a sales figure of the product model associated with the product model identifier 301 and indicates sales figure information generated by selling products via the product sale webpage linked to the hyperlink. Namely, the sales figure indicates sales figure information of a product sold by a predetermined shopping mall server via a shopping mall intermediate system associated with the customized product information providing system.

Also, the customized product information providing system 100 may include an authenticated user information database for recording user information associated with a plurality of users capable of being authenticated and may construct the basic index database by referring to the authenticated user information database. Hereinafter, a method of constructing the basic index database will be described.

To construct the basic index database, when each user is in an authenticated state with respect to the customized product information providing system 100, the basic index data of each user is generated in association with each product model. Namely, when a user logs in the customized product information providing system 100 and clicks a detailed description page or a hyperlink with respect to a predetermined product model, each click log count may be generated.

Next, the user information of each user is queried with reference to the authenticated user information database, and the generated basic index data is recorded in association with the user information. When the basic index data is generated, the user information of the user generating the basic index data, such as age and gender, may be queried and the generated basic index data may be stored in association with the queried user information in the basic index database.

The sales figure to be stored in the basic index data may be received from a predetermined shopping mall server administrating the product sale webpage or on-line store webpage. When receiving the sales figure, the sales figure may be received in association with the user information of the user purchasing the product and may be stored in association with the user information.

In operation 202, the customized product information providing system 100 extracts the basic index data of the user corresponding to a predetermined classification standard from the basic index database. The predetermined classification or profiling standard is associated with at least one of sex, age, and period and may be selected by the shopping information user accessing the predetermined webpage.

The extraction of the basic index data may be performed by searching for the user information corresponding to the predetermined classification standard from the basic index database and extracting the basic index data associated with the retrieved user information. For example, referring to FIG. 3, when the user selects "male" as the classification standard for searching product information with respect to a digital camera, basic index data "17-11-25", "5-3-19" and "31-25-45" of users who have the user information of "M" can be extracted. Also, when the user selects "male and twenties" as the classification standard, the basic index data "17-11-25" of a user who has the user information of "M" and age in twenties can be extracted.

Also, the customized product information providing system 100 according to the present embodiment may provide the product information by extracting the basic index data by using the user information of the shopping information user. When the shopping information user is in an authenticated state with respect to the customized product information providing system 100, namely, in a logged-in state, user information of the shopping information user is extracted from the authenticated user information database.

When the shopping information user is not in the authenticated state with respect to the customized product information providing system 100, namely, not in the logged-in state, whether a temporary file including the user information associated with the shopping information user exists in a terminal of the shopping information user is checked. When the temporary file exists, the user information of the shopping information user may be extracted from the temporary file. The temporary file may include information associated with the shopping information user, such as sex, age, and a time period.

The temporary file is temporarily generated and stored in a user terminal as a cookie and may include user information associated with a predetermined webpage. For example, when an Internet user first accesses a certain website, cookie information including an ID and password information of the user is generated such that the user may access the website without an additional authentication process at a subsequent access.

In operation 203, the customized product information providing system 100 computes the extracted basic index data and generates point information associated with each product model. The point information may be generated by giving a first weight to the detailed description page click log count, giving a second weight to the hyperlink click log count, giving a third weight to the sales figure, and adding all results. For example, when the detailed description page click log count is a, the hyperlink click log count is b, the sales figure is c, the first weight is A, the second weight is B, and the third weight is C, the point information or score MP may be generated via Equation "MP=a*A+b*B+c*C".

The first through third weights may have different values from each other according to the basic index data. For example, values of the weights may be selected in an order of "the third weight >the second weight >the first weight" by giving a relatively higher weight to the basic index data associated with sales.

In operation 204, the customized product information providing system 100 displays a list of each product model on a predetermined webpage according to the generated point information. The product models may be sorted in descending or ascending order of the generated point information and at least one of the sorted product models may be outputted on the webpage. Hereinafter, a method of displaying product information will be described with reference to FIGS. 4 and 5.

FIG. 4 is a diagram illustrating an example of a screen for selecting a classification standard, which is shown to a shopping information user, according to an embodiment of the present invention. As shown in FIG. 4, the shopping information user may select a time period, age, and sex, which are classification standards with respect to a desirable product. When the shopping information user searches for product information by selecting "three months, thirties, and male" with respect to a digital camera, the customized product information providing system 100 may extract basic index data with respect to a product model identifier whose user information is "thirties and male" and which is included in a previous three month period from a point in time of a search request, from the basic index database.

Figure 5:
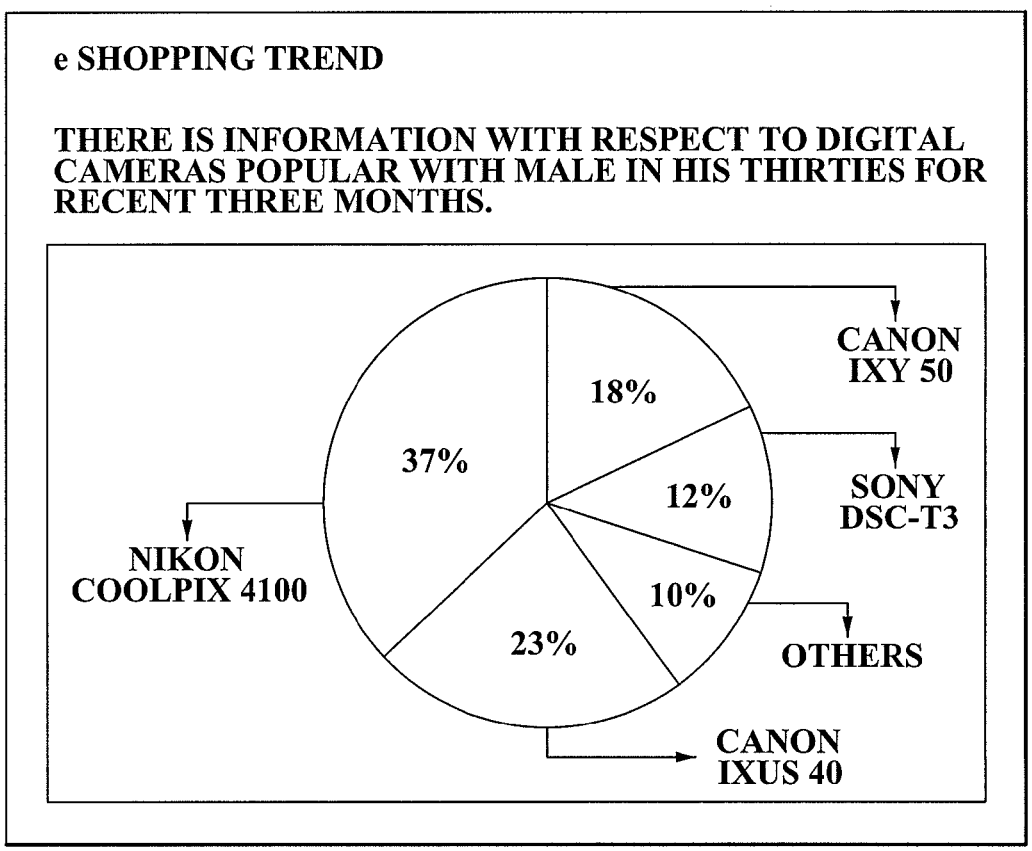
FIG. 5 is a diagram illustrating an example of product information displayed on a webpage, according to an embodiment of the present invention.

Point information is generated from the extracted basic index data, and corresponding product models are displayed in a circular or a pie graph according to the generated point information as shown in FIG. 5, thereby easily checking a shopping tendency with respect to a digital camera according to the classification standard desired by the shopping information user, namely, in what an order of popularity of product models for males in his thirties. Also, the product models may be displayed in a time-based graph or a bar graph.

Figure 6:
FIG. 6 is a diagram illustrating an example of product information displayed according to user information of the shopping information user, according to an embodiment of the present invention.

FIG. 6 is a diagram illustrating an example of product information displayed according to user information of the shopping information user, according to an embodiment of the present invention. As shown in FIG. 6, when a shopping information user whose user identifier is "bluesky" accesses the customized product information providing system 100 and is in an authenticated state, the product information may be provided according to the user information of the shopping information user. To provide the product information according to the user information, the user information associated with the shopping information user is extracted from the authenticated user information database. For example, when the user information of the shopping information user is "age: 26 and sex: female", basic index data associated with the user information is extracted from the basic index data. Namely, identifiers of product models associated with a user, whose user information is "twenties and F", may be extracted from the basic index database.

Point information may be generated from the extracted basic index data, and the product models may be provided to the shopping information user according to the generated point information. When providing the product models, the product models having relatively higher point information may be preferentially provided.

Also, the customized product information providing system 100 according to the present embodiment may receive a search query with respect to a product category from the shopping information user and may provide the product information associated with the search query to the shopping information user. Hereinafter, a method of providing product information by using a search query will be described.

When receiving a predetermined search query from the shopping information user, at least one product model associated with a product category corresponding to the received search query is retrieved from the basic index database. For example, when the shopping information user inputs "perfume" as the search query, at least one model identifier whose product category is "perfume" may be searched retrieved from the basic index database.

Next, when the model identifier is searched, the basic index data corresponding to the searched product model is extracted from the basic index database and point information associated with the retrieved at least one product model is generated by using the extracted basic index database.

When the point information is generated, the retrieved product model is sorted in descending order of the generated point information. Namely, the product models may be arranged in an order of having the relatively higher generated point information. The retrieved one product model may be sorted in ascending order of the generated point information.

Finally, the sorted product model is outputted on the webpage as a search result of the search query. Namely, the product information may be provided in an order of the product model having higher point information. Accordingly, product trend information associated with the product that the shopping information user wants to see may be provided, thereby giving the shopping information user great convenience of purchasing the product.

Figure 7:
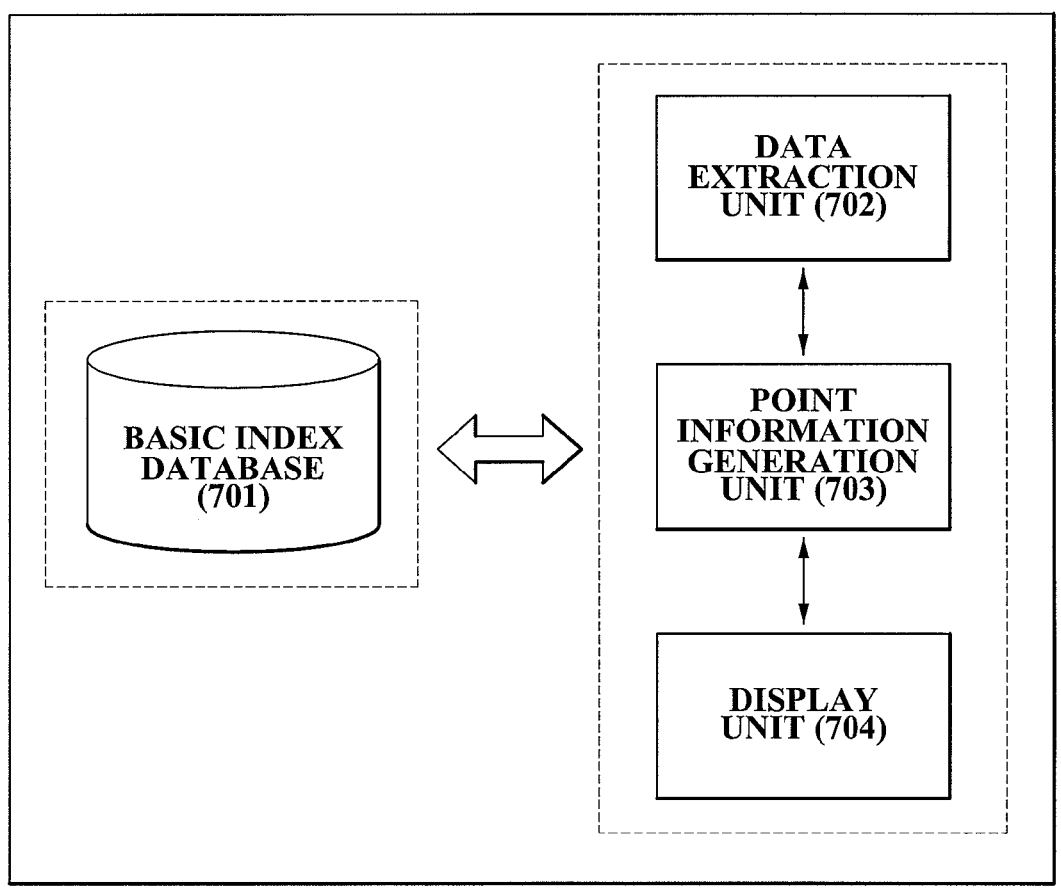
FIG. 7 is a diagram illustrating an inner configuration of a customized product information providing system according to an embodiment of the present invention.

Hereinafter, a customized product information providing system will be described with reference to FIG. 7. FIG. 7 is a diagram illustrating an inner configuration of a customized product information providing system 700 according to an embodiment of the present invention. The customized product information providing system 700 includes a basic index database 701, a data extraction unit 702, a point information generation unit 703, and a display unit 704.

The basic index database 701 maintains basic index data associated with a plurality of users corresponding to each product model. The basic index data may include data associated with at least one of a click log count of a detailed description page associated with the product model, a click log count of a hyperlink associated with the product model, and a sales figure of the product model. The sales figure indicates the number of the product model sold via a product sale webpage linked by the hyperlink. Also, the basic index database 701 may further record user information associated with the plurality of users and product category information associated with each product model. Also, the customized product information providing system 700 according to the present embodiment may further maintain an authenticated user information database for recording user information associated with users capable of being authenticated.

The data extraction unit 702 extracts basic index data of users corresponding to a predetermined classification standard with reference to the basic index database 701. The predetermined classification standard is associated with any one of sex, age, and a time period and may be selected by a shopping information user accessing the predetermined webpage.

Also, the data extraction unit 702 may extract the basic index data with reference to user information of the shopping information user. When the shopping information user is in an authenticated state, the user information of the shopping information user may be searched with reference to the authenticated user information data and the basic index data associated with the searched user information may be extracted from the basic index database 701.

When the user is not in an authenticated state, whether a temporary file associated with the shopping information user exists in a user terminal of the shopping information user is checked. When the temporary file exists, the user information associated with the shopping information user may be retrieved from the temporary file and the basic index data associated with the retrieved user information may be extracted from the basic index database 701.

The point information generation unit 703 generates the point information associated with each product model by computing the extracted basic index data. The point information may be generated by giving a first weight to the click log count of the detailed description page, giving a second weight to the click log count of the hyperlink, giving a third weight to the sales figure, and adding all results. The first through third weights may be selected by a system designer.

The display unit 704 displays each product model on a predetermined webpage according to the generated point information. The product model is sorted in a descending or an ascending order according to the point information generated by the point information generation unit 703 and may be displayed in various forms such as a predetermined circular or a pie graph, a bar graph, and a time-based graph.

The multimedia data genre determination method according to an embodiment of the present invention may be embodied as a program instruction capable of being executed via various computer units and may be recorded in a computer readable recording medium. The computer readable medium may include a program instruction, a data file, and a data structure, separately or cooperatively. The program instructions and the media may be those specially designed and constructed for the purposes of an embodiment of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention.

While embodiments of the invention has been particularly shown and described, various changes in form and details may be made therein without departing from the spirit and scope of the invention as defined by the appended claims. Therefore, the scope of the invention is defined not by the detailed description of embodiments of the invention but by the appended claims, and all differences within the scope will be construed as being included in the scope the present invention.

An aspect of the present invention provides a customized product information providing method and system in which basic index data of a product model associated with a classification standard selected by a predetermined shopping information user is extracted, point information associated with each product model is generated by using the extracted basic index data, and each product model is displayed on a predetermined webpage according to the point information.

An aspect of the present invention also provides a customized product information providing method and system for providing product information suitable for a shopping information user by using point information generated from basic index data associated with user information of the shopping information user, thereby providing product information distinguished from exemplary services.

An aspect of the present invention also provides a customized product information providing method and system providing an identical product model according to various classification standards, thereby providing product information according to selection of a shopping information user.

What is claimed is:

1. A method, using a processor, for operating an on-line shopping mall, the method comprising:

providing a database to store basic index data associated with shopping activity data of users corresponding to product models based on click log counts which represent on-line shopping activities of users with regard to goods for sale in the on-line shopping mall, wherein the database further comprise information about the users to determine that a shopper belongs to at least one of a plurality of predetermined groups;

receiving, by a product information server, an input from a user requesting customized product information submitted for the on-line shopping mall, the product information server comprising the processor and coupled to the database via a network;

upon receipt of the input, determining, by the processor, the customized product information of the user by extracting basic index data corresponding to product models and correlating the extracted basic index data with the basic index data of the requested user, wherein the determination further comprises to determine whether a first one of the plurality of predetermined groups the user belongs to based on the determined customized product information of the user;

generating the customized product information representing prioritized popularity of the product models by the first predetermined group, the prioritization is determined by computing click log counts and buying activities of the users, the computation identifies customized product model information based on the basic index data of the users;

retrieving, from the database, an accumulated number of the click log counts and buying activities of the users transmitted from each different on-line shopping activity for a period of time with respect to a single product model;

customizing the shopping activity data by classifying the activity as detailed description page click log counts and hyperlink click log counts associated with the product models and providing a different weight for the respective click log counts to represent different on-line shopping activity so as to obtain a multiplied value;

calculating point information based on the respective classified click log counts and the buying activities, each value of the point information is determined by the different weight; and transmitting data for displaying a prioritized list of goods that are popular to the first predetermined group associated with the customized product model information to a user terminal according to the correlated basic index data based on the prioritized popularity of the users and the point information.

2. The method of claim 1, wherein the on-line shopping mall comprises a link system configured to link a plurality of on-line stores registered with the on-line shopping mall.

3. The method of claim 1, wherein the on-line shopping activities comprises clicking links to web pages of descriptions of goods, clicking links to web pages of on-line stores of goods, and purchasing transactions of goods from on-line stores.

4. The method of claim 1, further comprising:
updating the database according to at least one on-line shopping activity comprising a new user activity.

5. The method of claim 1, wherein the user input comprises profile information of the user.

6. The method of claim 1, wherein the basic index data comprises an age and a gender of the user.

7. The method of claim 6, wherein the basic index data comprises a period of the customized product model information requested by the user.

8. The method of claim 7, wherein the basic index data comprises user account information.

9. The method of claim 1, wherein the user input comprises a username with or without user authentication.

10. The method of claim 1, wherein transmitting the customized product model information comprises transmitting graphical information associated with the prioritized popularity of the users.

11. The method of claim 10, wherein extracting the basic index data of the users comprises extracting ages, genders and periods of the customized product information requested by the users for performing
searching in the database for products using the user's desired product category; and
prioritizing popularity of the searched products by the first predetermined group.

12. The method of claim 1, further comprising:
computing, using the processor, a score for each of the product models based on on-line shopping activities associated with customized product information; and
displaying the product models prioritized in an order based on the basic index data.

13. The method of claim 1, wherein the on-line shopping activities associated with the classified shopping activity comprises clicking links for web pages comprising descriptions of goods, clicking links for web pages of on-line stores of goods, and purchase transactions of product models from online stores, wherein the weight of purchase transactions is greater than the weight of click log counts associated with clicking links for web pages.

* * * * *